(12) United States Patent
Herzog et al.

(10) Patent No.: US 8,314,185 B2
(45) Date of Patent: Nov. 20, 2012

(54) VULCANIZABLE RUBBER MIXTURE AND RUBBER PRODUCTS COMPRISING THE SAME

(75) Inventors: Katharina Herzog, Harsum (DE); Isabel Albers, Steeple (GB); Carla Recker, Hannover (DE); Jürgen Wagemann, Bad Salzdetfurth (DE); Marc Laschet, Hannover (DE); Christoph Rose, Hannover (DE); Boris Mergell, Barsinghausen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 131 days.

(21) Appl. No.: 12/801,525

(22) Filed: Jun. 14, 2010

(65) Prior Publication Data
US 2010/0292406 A1   Nov. 18, 2010

Related U.S. Application Data

(63) Continuation of application No. PCT/EP2008/066133, filed on Nov. 25, 2008.

(30) Foreign Application Priority Data

Dec. 14, 2007 (EP) .................................. 07024326

(51) Int. Cl.
*C08L 83/04* (2006.01)
(52) U.S. Cl. ......................................................... 525/106
(58) Field of Classification Search .................... 525/106
See application file for complete search history.

(56) References Cited

U.S. PATENT DOCUMENTS

| | | | |
|---|---|---|---|
| 3,239,481 A * | 3/1966 | Davison et al. ............... 523/212 |
| 4,914,248 A | 4/1990 | Kitagawa et al. | |
| 5,206,301 A | 4/1993 | Hattori et al. | |
| 5,929,149 A | 7/1999 | Matsuo et al. | |
| 6,013,718 A * | 1/2000 | Cabioch et al. ............... 524/506 |
| 6,562,923 B1 | 5/2003 | Robert et al. | |
| 6,667,362 B2 | 12/2003 | Robert et al. | |
| 7,625,983 B2 | 12/2009 | Lesage | |
| 2003/0119966 A1 | 6/2003 | Fusamae et al. | |
| 2006/0148994 A1 * | 7/2006 | Lesage ......................... 525/242 |

OTHER PUBLICATIONS

Markham, Richard L., "Introduction to Compatibilization of Polymer Blends", Advances in Polymer Technology, (1990), pp. 231 to 236, vol. 10, No. 3, John Wiley & Sons, Inc.

Nagata, N. et al, "Effect of Chemical Modification of Solution-Polymerized Rubber on Dynamic Mechanical Properties in Carbon-Black-Filled Vulcanizates", Rubber chemistry and technology 60, 1987, pp. 837 to 855.

* cited by examiner

*Primary Examiner* — Kuo-Liang Peng
(74) *Attorney, Agent, or Firm* — Ottesen P.A.

(57) ABSTRACT

A vulcanizable rubber mixture and its use for rubber products, which need good grip in wet or icy conditions, in particular vehicle tires and vehicle tire treads, but also technical rubber products like belts on conveyor systems, technical hoses, or vibration dampers and impact dampers. The vulcanizable rubber mixture includes from 10 to 100 phr of a block copolymer functionalized at least at one chain end (terminally) for binding to fillers, at least one filler and, optionally, additives. The block copolymer contains a statistically or microsequentially polymerized copolymer comprising a conjugated diene and an aromatic vinyl compound, and has, polymerized onto at least one end of the main chain, a terminally functionalized block of different structure to the main chain, which structure is homopolymeric or copolymeric, from 5 to 250 monomer units long, and composed of at least one of the mers of the main chain copolymer.

17 Claims, No Drawings

VULCANIZABLE RUBBER MIXTURE AND RUBBER PRODUCTS COMPRISING THE SAME

CROSS REFERENCE TO RELATED APPLICATIONS

This application is a continuation application of international patent application PCT/EP 2008/066133, filed Nov. 25, 2008, designating the United States and claiming priority from European application 07024326.6, filed Dec. 14, 2007, and the entire content of both applications is incorporated herein by reference.

FIELD OF THE INVENTION

The invention relates to a vulcanizable rubber mixture and to rubber products comprising the same which need good grip in wet conditions or in icy conditions, in particular vehicle tires and vehicle tire treads, but also technical rubber products like belts on conveyor systems, which can have exposure to weathering, technical hoses or vibration dampers and impact dampers.

BACKGROUND OF THE INVENTION

The rubber products mentioned must in practice meet various requirements, and it is often difficult or impossible to meet these simultaneously. For example, rubber products and in particular vehicle tires are required to have good elasticity, low abrasion and good adhesion on various surfaces and are required to maintain these properties at high and low temperatures.

The service properties of vulcanizates or rubber mixtures used for vehicle tires are specifically adjusted inter alia via the selection of the rubber polymers used, via functionalization of the same, via chemical and/or adsorptive/physical binding to the filler and via the selection of the fillers and additives. However, a conflict frequently arises because optimization of a desired property impairs another property that is likewise desired.

Tire rubber mixtures, in particular for treads, often comprise olefinic polymers optionally having aryl side chains. Rubber materials very often used in tire tread mixtures are copolymer rubbers composed of conjugated dienes and of aromatic vinyl compounds. SBR rubber (styrene-butadiene rubber) is the most important member of this group.

Alongside random SBR copolymers, block copolymers are also known, and block formation here appears to have a decisive effect on some performance properties.

U.S. Pat. No. 5,206,301 uses particular block constitutions in order to improve the performance properties of a thermoplastic block copolymer which is intended to raise weathering resistance and impact resistance in rubber materials and resins, a particular intention being to increase heat resistance. This is achieved via blockwise differences affecting the types of butadiene linkage and affecting vinyl contents.

U.S. Pat. No. 6,667,362 discloses a diene polymer modified terminally by a silanol group and optionally having a polysiloxane spacer. The diene polymer can be an SBR rubber.

SUMMARY OF THE INVENTION

It is an objective of this invention to provide a rubber mixture which can be used for rubber products and, in particular, vehicle tires and treads of vehicle tires and whose performance properties have been improved in relation to grip in icy conditions and in wet conditions.

This objective is achieved by a vulcanizable rubber mixture which comprises at least one block copolymer functionalized at least at one chain end, that is, terminally, for binding to fillers, at least one filler and, if appropriate, additives, a feature of the mixture being that it comprises from 10 to 100 phr of a randomly (statistically) or microsequentially polymerized copolymer comprising a conjugated diene and an aromatic vinyl compound and which has, polymerized onto at least one end of the main chain polymer in form of the statistically or microsequentially polymerized copolymer, a terminally functionalized block of different structure to the main chain, which structure is homopolymeric or copolymeric, from 5 to about 250 monomer units, more preferably between 20 and 180 monomer units long, and composed of at least one of the mers of the main chain copolymer, with the provision that the glass transition temperatures on the one hand of the main chain and on the other hand of the terminal block or block polymer are different.

The term phr (parts per hundred parts of rubber by weight) used here is the usual term for amounts for mixing formulations in the rubber industry. The amount added in parts by weight of the individual substances is always based here on 100 parts by weight of entire weight of all of the rubber components present in the mixture.

Although, as described above, it was known that block polymers can be functionalized, it has not been known that the properties of random and microsequential polymers of the SBR class, and the grip properties, in wet conditions and in icy conditions, of tires and of other rubber products obtained using these rubber mixtures can be improved via addition of a block to the end of the main chain of at least one of the SBR-type copolymers, where the block is of 5 to about 250 units long and composed of at least one of the main chain mers. The terminal block bears a functional group for interaction with the filler and has a different structure compared to the main chain copolymer. In accordance with the different structure of the two polymeric regions of the copolymer, the different structures or different regions, that is, the SBR-type copolymer main chain as cited above and the terminal block bearing the at least one terminal functional group, have different glass transition temperatures (Tg). The two regions of the copolymer can be characterized by these different glass transition temperatures.

With the help of the structurally different regions of the new copolymer of the mixture, characterized by different glass transition temperatures, the conflict arising when several performance properties shall be optimized at the same time can better be resolved.

It was found that this effect may even be enhanced when the terminal block is an internally homopolymeric block, which might be attributed to the fact that a uniform structure is introduced into the "glassy layer", that is, the layer around the filler with which the functional group interacts within the vulcanizable mixture or within the rubber. Thus, preferably the terminal block is an internally homopolymeric block.

DESCRIPTION OF THE PREFERRED EMBODIMENTS OF THE INVENTION

An advantageous process for the preparation of the functionalized copolymer used in the inventive mixture consists of using firstly a conjugated diolefin, such as preferably butadiene, and secondly an aromatic vinyl compound, such as preferably styrene, and polymerizing these randomly or microsequentially, that is, under conditions where at least for a time both comonomers are present in the mixture, and with suitable reaction conditions (i.e. as in the prior art, for example disclosed in U.S. Pat. No. 5,206,301 or U.S. Pat. No. 7,625,983), and specifically polymerizing, onto the living polymer, a short block of from about 5 to 250 monomer units, and functionalizing this "spacer block" terminally, as likewise known per se in the prior art.

The functionalization is usually introduced by way of a functionalized terminator. As an alternative, the active polymer chain end can, on termination of the polymerization, be reacted with a compound which comprises the desired functional group to be added to the end and also comprises a suitable leaving group. By way of example, this can be achieved via reaction of the reactive polymer ends with compounds such as ethylene oxide, benzophenone, carbon dioxide, dialkylaminobenzaldehyde, carbon disulfide, alkoxysilanes, alkylphenoxysilanes, phenoxysilanes, etc., as is previously known from the prior art to the person skilled in the art. By way of example, U.S. Pat. No. 5,206,301 or U.S. Pat. No. 5,929,149 cites suitable processes and groups.

The functionalization is introduced in order to improve the cohesion or binding force between rubber and filler, i.e. carbon black or silicon oxide based (in this case preferably generally white) fillers. Bifunctional coupling agents, particularly preferably silanes and amines, can also be used as additives for the rubber mixtures.

Furthermore, coupling agents like $SnCl_4$ and $SiCl_4$ can be added.

A wide variety of functionalization is in principle possible.

It is preferable that identical or different functional groups, as cited in more detail below, are introduced at least one chain end or at both chain ends of the block copolymer, the degree of functionalization here, based on the block polymer, being from 0% to 100%, preferably from 50% to 95%, particularly from 75% to 95%.

One functional group can be introduced with the initiator during initiation of the chain, and the other can be introduced with the terminator at the end of the chain. These groups can be identical or different. It is preferable that a functional group is introduced only at the chain end in direct contact with the internally homopolymeric block, rather than on the randomly or microsequentially polymerized chain, since this group is intended to interact or react with the filler, and the intention is that the location of the homopolymeric block be in the vicinity of the filler.

The initiator used can, by way of example, also comprise a bifunctional initiator, as described in U.S. Pat. No. 6,562,923, the entire content of which is incorporated into this disclosure by way of reference. This method can be used to functionalize both polymer ends with the internally homopolymeric block and with the functionalization.

The terminal functional groups are preferably —OH, —COOH, —COX, where X=halogen, —SH, —CSSH, —NCO, amino, epoxy, silyl, silanol or siloxane groups inclusive of, in each case attached to the polymer chain with or without a spacer, polysiloxane groups, and siloxane and polysiloxane groups comprising amino groups.

The spacer is a group indicated below by A.

In particular, the formulae of individual groups can be represented as follows: the amino groups by the formulae: -A-N(R$_1$)$_2$, -A-NHR$_1$, -A-NH$_2$, the silyl, silanol and siloxane groups can be represented by the following formulae:

-A-SiH$_2$(OH), -A-Si(R$_1$)$_2$(OH), -A-SiH(OH)$_2$,
-A-SiR$_1$(OH)$_2$, -A-Si(OH)$_3$, -A-Si(OR$_1$)$_3$, -A-
(SiR$_1$R$_2$O)$_x$—R$_3$, -A-Si(R$_3$)$_3$, -A-Si(R$_3$/X)$_3$, where X=halogen, and the siloxane groups comprising amino groups can be represented via the following formula:

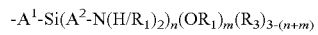

in each case where $R_1$ and $R_2$ are identical or different, being namely alkoxy or alkyl, branched or straight-chain, cycloalkyl, aryl, alkylaryl, aralkyl, or vinyl, in each case having from 1 to 20 carbon atoms, and mononuclear aryl, x=a whole number from 1 to 1500, n=0-3, m=0-3, with n+m≦3

$R_3$ is —H, or -alkyl, branched or straight-chain, or cycloalkyl, in each case having from 1 to 20 carbon atoms, or mononuclear aryl, and $A^1$ and $A^2$ are each a $C_0$-$C_{12}$ organic spacer chain, branched or unbranched, preferably $C_0$-$C_{12}$-alkyl, -allyl or -vinyl, ($C_0$ meaning here the absence of the spacer chain).

Siloxane groups that contain amino groups, are represented best by the formula -A1-Si-A2-N((H)$_k$(R$_1$)$_{2-k}$)$_y$(OR$_1$)$_z$(R$_3$)$_{3-(y+z)}$, where: k can vary from 0 to 2, y can vary from 1 to 3, and z can vary from 0 to 2, 0≦y+z≦3, provided that $R_1$ and $R_2$ are identical or different, and can be alkyl, linear or branched, cycloalkyl, aryl, alkylaryl, aralkyl or vinyl groups, in each case having 1 to 20 carbon atoms, and mononuclear aryl groups, $R_3$ is H or alkyl, linear or branched, in each case having 1 to 20 carbon atoms, or a mononuclear aryl group, and A1 and A2 are chains of up to 12 carbon atoms, linear or branched, preferably alkyl, allyl or vinyl.

For the terminal functional groups intended to interact with the filler, siloxane and silanol groups are preferred.

For the elastomers of this invention, most preferably siloxanes are used as terminal functional groups of the polymeric chains, in the form or structures that can be represented by the general formula —[—Si(R$_1$R$_2$)—O—]$_n$—Si(R$_1$R$_2$)—OH, where n is an integer up to 500, and $R_1$ and $R_2$ are identical or different, and can be alkoxy or alkyl, linear or branched, cycloalkyl, aryl, alkylaryl, aralkyl or vinyl groups, in each case having 1 to 20 carbon atoms, and n represents the number of units of the siloxane functional group before a silanol terminal group.

To obtain the functionalization in the extremities of the polymeric chains, the preferred reagent is hexamethylcyclotrisiloxane (D3), which allows the incorporation of continuous sequences of the siloxane function group —[—Si(CH$_3$)$_2$—O—]—, in various lengths, and a silanol terminal group —Si(CH$_3$)$_2$—OH.

The terminally functionalized particular block polymer of the invention, which forms entirely or to some extent the rubber content of the vulcanizable rubber mixture, is a randomly or microsequentially polymerized, generally solution-polymerized, copolymer which is composed of conjugated diene or diolefin and aromatic vinyl compound, and which has, polymerized onto at least one end, a terminally functionalized block, homopolymeric or copolymeric, but preferably homopolymeric, and composed of at least one of the mers of the copolymer, where "mers" means the type of mers, i.e. one conjugated diene and/or one aromatic vinyl compound. The block is from 5 to about 250 monomer units long and because of its different structure characterized by a different glass transition temperature compared to the main chain to which it is attached.

The diolefin here can generally be a diene monomer having from 4 to about 10 carbon atoms, particular examples being 1,3-butadiene, 2-alkyl-1,3-butadiene, 2,3-dialkyl-1,3-butadiene, 2-alkyl-3-alkyl-1,3-butadiene, 1,3-pentadiene, 1,3-hexadiene, 2,4-hexadiene, etc.

The polyisoprene can be either 1,4-polyisoprene or 3,4-polyisoprene. The polybutadiene can be either 1,4- or vinyl-polybutadiene.

The diene of the copolymer and/or of the polymerized-on block is preferably a butadiene, an isoprene, or, in the random or microsequential polymer, a mixture of the two. Both in the case of polybutadiene and in the case of polyisoprene, the length of the internally homopolymeric block at the chain end is preferably from 10 to 200 monomer units, more preferably from 20 to 180 monomer units, and polyisoprene can comprise either 1,4 or 3,4, and butadiene can comprise either 1,4 or 1,2-units. In total, from 8 to 80% of 1,2 and, respectively, 3,4.

The aromatic vinyl compound is preferably styrene, both within the random or microsequential copolymer and also within the polymerized-on block. However, in principle it is also possible to use other aromatic vinyl compounds, which, however, are not important industrially. Among these are in particular ortho, meta and/or para-methylstyrene, vinyltoluene, p-tert-butylstyrene, methoxystyrenes, vinylmesitylene and divinylbenzene.

According to one preferred embodiment, the internally homopolymeric block at the chain end is a polystyrene block whose length is preferably from 5 to 250 monomer units, more preferably from 10 to 200 or from 20 to 180 monomer units.

The random or microsequential copolymer can have any desired cis or trans structure. It is generally obtained via solution polymerization. "Microsequential" here means that one or both comonomers can be present at least partially in the form of microblocks. The microblocks here preferably encompass from 2 to 10, more preferably from 3 to 10, and in particular from 3 to 6, connected units of a comonomer.

The diolefin content, which is preferably the butadiene content of the SBR-type polymer can comprise either 1,4-cis, 1,4-trans or 1,2-vinyl structures. The vinyl content is adjustable in a known manner by way of the polymerization conditions. The vinyl content for inventive functionalized copolymers is preferably, within the BR content or IR content, from 8 to 80%, preferably from 10 to 70%.

More specifically, the elastomers of this invention present a percentage composition in weight of their main chain, which can vary from 5% to 50%, for the aromatic vinyl monomer (e.g. styrene), and from 50 to 95% for the conjugated diene (e.g.: 1,3-butadiene). Preferably, these elastomers present a composition from 15% to 40% for the % w/w of the monomer with an aromatic vinyl structure, and from 60% to 85% for the % w/w of the conjugated diene incorporated in the copolymer.

The elastomers of the invention have a Mooney Viscosity (ML+4 at 100° C.) in a range from 30 to 90, and an average molecular weight in the range from Mw=80,000 to 700,000, with a polydispersion in the range from 1.05 to 4.0, when analyzed by Size Exclusion Chromatography (SEC), based on polystyrene standards.

The elastomers present glass transition temperatures, Tg, in the range from −92° C. to +1° C., in particular from −50 to 0° C., depending on the chemical content of the aromatic vinyl monomer of the copolymer and the microstructure of the conjugated diene incorporated in the copolymer.

The rubber content of the mixture can comprise not only the SBR-class block copolymer used according to the invention here but also preferably the following blend constituents: natural rubber (NR), polybutadiene (BR), polyisoprene (IR), polychloroprene (CR), styrene-isoprene-butadiene terpolymer and/or ethylene-propylene-diene rubber (EPDM), IBR, SBR. The rubber mixture preferably comprises 30 to 90 phr of the block copolymer having random or microsequential content and from 10 to 70 phr of residual rubber content preferably composed of at least one elastomer rubber from the group of natural rubber (NR), synthetic polyisoprene (IR), polybutadiene (BR) or polychloroprene (CR), styrene butadiene rubber (SBR), styrene isoprene butadiene rubber (SIBR), isoprene butadiene rubber (IBR).

The mixture can moreover comprise conventional additives, such as plasticizers, antioxidants, UV stabilizers, mold-release agents, polymerization accelerators and polymerization retarders, activators, e.g. zinc oxide and fatty acids (e.g. stearic acid), waxes and mastication aids in conventional parts by weight.

The filler present in the mixture can preferably be what is known as a "white filler" or else carbon black. In one preferred embodiment, the filler comprises at least one silicon-oxide-based filler (silica, silicic acid) or comprises another "white" filler individually or in a mixture and can also comprise carbon black in the mixture.

The filler preferably comprises a mixture composed of at least one silicon-oxide-based filler and of at least one grade of carbon black. Suitable silicon-based fillers and carbon blacks for technical rubber moldings and tire mixtures are known in the prior art and can be used here. The fillers and rubbers of the mixture can likewise have been modified in the manner known in principle from the prior art for rubber mixtures.

The white filler can moreover preferably be an oxidic and/or hydroxidic inorganic or mineral filler, or comprise any desired combination of these substances. The white filler has preferably been selected from the group of silica ($SiO_2$), phyllosilicates, chalk, starch, oxides and/or hydroxides of aluminium, magnesium, titanium or zinc.

In one preferred embodiment, the content present of the filler in the mixture can be from 20 to 200 phr, preferably from 30 to 150 phr, more preferably from 30 to 130 phr, in particular for tread mixtures for cars and light-truck tires from 60 to 130 phr or preferably from 80 to 130 phr, of filler.

The rubber mixture can, if desired, also comprise a coupling reagent. Suitable coupling reagents are in principle likewise known to the person skilled in the art in this field.

The invention likewise encompasses the use of the inventive rubber mixture for the production of rubber products, especially technical rubber products which means products made of rubber with a technical field of application. In particular the rubber products of the invention encompass vehicle tires, in particular vehicle tire treads, hoses, belts, technical moldings or especially vibration dampers or impact dampers, and also comprises the associated tread and vehicle tire. The vehicle tire is very generally a pneumatic vehicle tire.

For production of the rubber, the inventive unvulcanized rubber mixtures are further processed in a known manner, i.e. vulcanized with the aid of vulcanizing agents present in the mixture or added subsequently. The term "vulcanization" here is generally intended to mean the crosslinking of the substantially linear, not three-dimensional, rubber to give an elastomer rubber, irrespective of whether the traditional method using sulfur or sulfur-liberating reagents is used or other crosslinking agents suitable for natural rubbers and synthetic rubbers are used, these methods being known to the person skilled in the art.

The inventive rubber mixture is generally produced in a conventional manner, by first, in one or more stages of mixing, generally producing a parent mixture comprising all of the constituents except for the vulcanization system, and then producing the finished mixture by adding the vulcanization system. The mixture is then further processed, e.g. via an extrusion procedure, and converted to the appropriate form. The mixture is preferably converted to the form of a tread and, as is known, applied during production of the pneumatic vehicle tire parison. However, the tread can also be wound in the form of a narrow strip of rubber mixture onto a green tire which at this stage comprises all of the tire parts except for the tread. It is of no importance for the tires whether the entire tread has been produced from a single mixture or has, for example, a cap and base structure, as long as at least the area coming into contact with the road has been produced from the inventive rubber mixture.

Inventive examples are used below for further illustration of the invention, but these are intended solely for illustration and to improve understanding of the invention and not to restrict the invention.

The mixture is produced in two stages, as described above, in a laboratory tangential mixer. Test specimens were produced from all of the mixtures via vulcanization at an elevated pressure and temperature and these test specimens were used to determine typical rubber-industry properties of the materials, and these can be utilized as indicators for particular behaviour of the materials, i.e. particular handling properties.

The following test methods were used when testing the specimens:
Shore A hardness at room temperature and 70° C. to DIN 53 505
rebound at room temperature and 70° C. to DIN 53 512
tensile strength at room temperature to DIN 53 504
elongation at break at room temperature to DIN 53 504
stress values at 100 and 300% static elongation at room temperature to DIN 53 504
Tan delta at 0° C. to DIN 53 513 from measurement with variation of temperature using a dynamic deformation amplitude of 0.2% with 10% predeformation and 10 Hz.
average dynamic storage modulus E' at from −25 to 5° C. to DIN 53 513 from measurement with variation of temperature using a dynamic deformation amplitude of 0.2% with 10% predeformation and 10 Hz.

EXAMPLES

Example Group 1

Solution-Polymerized SSBR with Polymerized-on Polystyrene Block and Terminal Siloxane Functionalization Main Polymer (Block Copolymer Used According to the Invention)

TABLE 1.1

| Polymer | SSBR | Polystyrene block | Functional-ization |
| --- | --- | --- | --- |
| A1 (ref.) | 21% styrene, 63% vinyl content | — | amino |
| B1 | 21% styrene, 63% vinyl content | 54 PS units | siloxane |
| C1 | 21% styrene, 63% vinyl content | 154 PS units | siloxane |

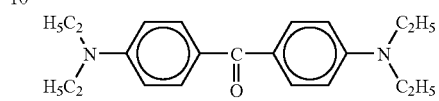

Amino: Nagata et al., Rubber chemistry and technology, 60, 1987, 837 Siloxane functionalization as described in U.S. Pat. No. 6,667,362 (hexamethyltrisiloxanol)

Mixing Formulations:

TABLE 1.2

|  | A1 | B1 | C1 | B1-NR | C1-NR | B1-BR | C1-BR |
| --- | --- | --- | --- | --- | --- | --- | --- |
| NR | — | — | — | 50 | 50 | — | — |
| BR | — | — | — | — | — | 50 | 50 |
| A1 (ref.) | 100 | — | — | — | — | — | — |
| B1 | — | 100 | — | 50 | — | 50 | — |
| C1 | — | — | 100 | — | 50 | — | 50 |
| Silica | 95 | 95 | 95 | 95 | 95 | 95 | 95 |
| Oil | 35 | 35 | 35 | 35 | 35 | 35 | 35 |
| 6PPD | 2 | 2 | 2 | 2 | 2 | 2 | 2 |
| TMQ | 2 | 2 | 2 | 2 | 2 | 2 | 2 |
| Antiozonant wax | 2 | 2 | 2 | 2 | 2 | 2 | 2 |
| ZnO | 2 | 2 | 2 | 3 | 3 | 3 | 3 |
| Stearic Acid | 2 | 2 | 2 | 3 | 3 | 3 | 3 |
| Silane | 8 | 8 | 8 | 8 | 8 | 8 | 8 |
| DPG | 2 | 2 | 2 | 2 | 2 | 2 | 2 |
| CBS | 2 | 2 | 2 | 2 | 2 | 2 | 2 |
| Sulfur | 2 | 2 | 2 | 2 | 2 | 2 | 2 |

6PPD = N-(1,3-dimethylbutyl)-N'-phenyl-p-phenylenediamine
TMQ = 2,2,4-trimethyl-1,2-dihydroquinoline
DPG = N,N-diphenylguanidine
CBS = benzothiazyl-2-cyclohexylsulphenamide
Oil/plasticizer = TDAE
Silane/functionalization reagent = SILQUEST A-1589 SILANE, General Electric Speciality, USA
Silica = VN3, Degussa AG, Germany, nitrogen surface area: 175 m²/g, CTAB surface area 160 m²/g;

Test Results:

TABLE 1.3

|  | Unit | Ref. A1 | B1 | C1 | B1-NR | C1-NR | B1-BR | C1-BR |
| --- | --- | --- | --- | --- | --- | --- | --- | --- |
| Shore A hardness (RT) | ShA | 75.3 | 73.5 | 76.5 | 72.8 | 72.5 | 72.1 | 71.8 |
| Shore A hardness (70° C.) | ShA | 70.4 | 70.5 | 70.8 | 69.2 | 67.9 | 69.3 | 68.2 |

TABLE 1.3-continued

|  | Unit | Ref. A1 | B1 | C1 | B1-NR | C1-NR | B1-BR | C1-BR |
|---|---|---|---|---|---|---|---|---|
| Rebound elasticity (RT) | % | 15.6 | 14.9 | 13.3 | 22 | 19.3 | 32.2 | 28.6 |
| tan d (° C.) | — | 0.54 | 0.554 | 0.576 | 0.365 | 0.384 | 0.276 | 0.289 |
| Stress value 100% | MPa | 3.6 | 3.5 | 3.62 | 2.49 | 2.37 | 2.61 | 2.47 |
| Rebound elasticity (70° C.) | % | 42.5 | 44.4 | 37 | 44.9 | 40.9 | 47.7 | 43.9 |

The results show that braking in wet conditions can be improved as desired while handling performance remains the same. Rebound at room temperature and tan d (0° C.) are conventional indicators for braking in wet conditions. Braking performance in wet conditions improves as the values for rebound at room temperature decrease and as the values for tan d (0° C.) increase. Braking performance in wet conditions is also better for all of the blends with the block copolymer of the examples.

The combination of the properties of rebound at 70° C. and M100 is used to represent handling. The rebound at 70° C. here serves as an indicator for handling-maneuver grip (improving as the values decrease), and the stress value for 100% elongation serves for stiffness during handling (improving as the value increases). The examples of polymers having a polystyrene block also exhibit advantages during handling, although at the same time there is an improvement in grip under wet conditions.

Example Group 2

Solution-Polymerized SSBR Having Polymerized-on Butadiene Block and Terminal Siloxane Functionalization Main Polymer (Block Copolymer Used According to the Invention)

TABLE 2.1

| Polymer | SSBR | Polybutadiene block (BR) | Functionalization |
|---|---|---|---|
| A2 (ref.) | 21% styrene, 63% vinyl content | — | siloxane |
| B2 | 21% styrene, 63% vinyl content | 50 BR units | siloxane |
| C2 | 21% styrene, 63% vinyl content | 150 BR units | siloxane |

Siloxane functionalization as described in U.S. Pat. No. 6,667,362 (hexamethyltrisiloxanol), the disclosure of which with respect to this siloxane functionalization is hereby incorporated into the content of this application.

Mixing Formulations:

TABLE 2.2

|  | 1 | 2 | 3 | 4 | 5 | 6 |
|---|---|---|---|---|---|---|
| A2 (ref.) | 100 | — | — | 50 | — | — |
| C2 | — | — | 100 | — | — | 50 |
| B2 | — | 100 | — | — | 50 | — |
| BR | — | — | — | 50 | 50 | 50 |
| Silica | 95 | 95 | 95 | 95 | 95 | 95 |
| Oil | 35 | 35 | 35 | 45 | 45 | 45 |
| 6PPD | 2 | 2 | 2 | 2 | 2 | 2 |
| TMQ | 2 | 2 | 2 | 2 | 2 | 2 |
| Antiozonant wax | 2 | 2 | 2 | 2 | 2 | 2 |
| ZnO | 2.5 | 2.5 | 2.5 | 2.5 | 2.5 | 2.5 |
| Stearic Acid | 2.5 | 2.5 | 2.5 | 2.5 | 2.5 | 2.5 |
| Silane/Fct reagent | 8.075 | 8.075 | 8.075 | 6.650 | 6.650 | 6.650 |
| DPG | 2 | 2 | 2 | 2 | 2 | 2 |
| CBS | 2 | 2 | 2 | 1.6 | 1.6 | 1.6 |
| Sulfur | 2 | 2 | 2 | 2 | 2 | 2 |

Silica: VN3, Degussa AG, Germany, nitrogen surface area: 175 m$^2$/g, CTAB surface area 160 m$^2$/g;
Silane functionalization reagent: Silquest A 1589, General Electric Specialty, USA
6PPD = N-(1,3-dimethylbutyl)-N'-phenyl-p-phenylenediamine
TMQ = 2,2,4-trimethyl-1,2-dihydroquinoline
DPG = N,N-diphenylguanidine
CBS = benzothiazyl-2-cyclohexylsulphenamide
Oil/plasticizer = TDAE Test Results:

TABLE 2.3

|  | Unit | 1 | 2 | 3 | 4 | 5 | 6 |
|---|---|---|---|---|---|---|---|
| Shore A hardness (RT) | ShA | 68.3 | 69.8 | 70.7 | 62.8 | 63.6 | 63.1 |
| Shore A hardness (70° C.) | ShA | 65.0 | 66.6 | 67.6 | 59.0 | 59.9 | 59.3 |
| Rebound elasticity (RT) | % | 15.0 | 14.9 | 14.5 | 32.2 | 32.4 | 32.7 |
| Rebound elasticity (70° C.) | % | 50.4 | 48.8 | 48.9 | 46.9 | 44.9 | 45.5 |
| Tensile strength at RT | MPa | 14.8 | 14.7 | 13.1 | 14.8 | 14.1 | 14.3 |

TABLE 2.3-continued

| | Unit | 1 | 2 | 3 | 4 | 5 | 6 |
|---|---|---|---|---|---|---|---|
| Elongation at break at RT | % | 325 | 340 | 309 | 578 | 577 | 576 |
| Stress value for 100% | MPa | 3.18 | 3.26 | 3.26 | 1.68 | 1.79 | 1.78 |
| Stress value for 300% | MPa | 14.97 | 13.96 | 14.46 | 6.30 | 6.22 | 6.29 |
| E' (from −25° C. to −5° C.) | MPa | 630 | 451 | 449 | 35 | 32 | 33 |

The storage modulus E' at from −25° C. to −5° C. can be considered to be an indicator for the improvement in grip in icy conditions, a reduced storage modulus being regarded as equivalent to the improvement in grip in icy conditions.

The results show that in the mixtures which comprise the block copolymer used according to the invention having a BR block, E' has been reduced, i.e. there is an improvement in grip in icy conditions, while wet grip is retained. The rebound at room temperature is used here as an indicator of wet grip (smaller values indicating improved wet grip).

It is understood that the foregoing description is that of the preferred embodiments of the invention and that various changes and modifications may be made thereto without departing from the spirit and scope of the invention as defined in the appended claims.

What is claimed is:

1. Vulcanizable rubber mixture which comprises from 10 to 100 phr of at least one block copolymer functionalized at least at one chain end (terminally) for binding to fillers, at least one filler and, optionally, additives, wherein at least one block copolymer comprises, as a main chain, a statistically or microsequentially polymerized copolymer comprising a conjugated diene and an aromatic vinyl compound, and which has, polymerized onto at least one end of the main chain, a terminally functionalized block of different structure to the main chain, which structure is homopolymeric or copolymeric, from 5 to 250 monomer units long, and composed of at least one of the monomers of the main chain, with the provision that the glass transition temperatures on the one hand of the main chain and on the other hand of the terminal block are different, wherein identical or different functional groups as listed below are present at at least one chain end or at both chain ends of the block copolymer consisting of main chain polymer and terminal block, the degree of functionalization, based on the at least one block copolymer, being from 30% to 100%:
—OH, —COOH, —COX, where X=halogen, —SH, —CSSH, —NCO, amino, epoxy, silyl, silanol or siloxane groups inclusive of, in each case attached to the polymer chain with or without a spacer, polysiloxane groups and siloxane and polysiloxane groups comprising amino groups.

2. Vulcanizable rubber mixture according to claim 1, wherein the terminal block is an internally homopolymeric block.

3. Vulcanizable rubber mixture according to claim 1, wherein the terminal block is composed of one or more conjugated diene monomers.

4. Vulcanizable rubber mixture according to claim 3, wherein the terminal block is from 10 to 200 units long.

5. Vulcanizable rubber mixture according to claim 1, wherein the terminal block is composed of one or more aromatic vinyl compound monomers.

6. Vulcanizable rubber mixture according to claim 5, wherein the terminal block is from 10 to 200 units long.

7. Vulcanizable rubber mixture according to claim 1, wherein the main chain is a microsequentially polymerized copolymer composed of a conjugated diene and of an aromatic vinyl compound, the main chain comprises microblocks of a comonomer of length from 2 to 10 units.

8. Vulcanizable rubber mixture according to claim 1, comprising from 30 to 90 phr of the at least one block copolymer, and 10 to 70 phr of a residual rubber content being composed of at least one elastomer rubber from the group consisting of natural rubber (NR), synthetic polyisoprene (IR), polybutadiene (BR) or polychloroprene (CR), SBR, IBR and SIBR.

9. Rubber mixture according to claim 1, the degree of functionalization, based on the at least one block copolymer, being from 50% 95%.

10. Rubber mixture according to claim 1, wherein the amino groups are represented by the following formulae: -A-N($R_1$)$_2$, -A-NH$R_1$, -A-NH$_2$, the silyl, silanol and siloxane groups can be represented by the following formulae: -A-SiH$_2$(OH), -A-Si($R_1$)$_2$(OH), -A-SiH(OH)$_2$, -A-Si$R_1$(OH)$_2$, -A-Si(OH)$_3$, -A-Si(O$R_1$)$_3$, -A-(Si$R_1$$R_2$O)$_x$-$R_3$, -A-Si($R_3$)$_3$, -A-Si($R_3$/X)$_3$, where X =halogen,
and the siloxane groups comprising amino groups are represented via the following formula:

-$A^1$-Si($A^2$-N(H/$R_1$)$_2$)$_n$(O$R_1$)$_m$($R_3$)$_{3-(n+m)}$ in each case where $R_1$ and $R_2$ are identical or different, being namely alkoxy or alkyl, branched or straight-chain, cycloalkyl, aryl, alkylaryl, aralkyl, or vinyl, in each case having from 1 to 20 carbon atoms, and mononuclear aryl, x = a whole number from 1 to 1500, $R_3$ is —H, or -alkyl, branched or straight-chain, or cycloalkyl, in each case having from 1 to 20 carbon atoms, or mononuclear aryl, and $A^1$, $A^2$ = a $C_0$-$C_{12}$ organic spacer chain, branched or unbranched.

11. Rubber mixture according to claim 1, wherein the filler is entirely or mainly composed of an oxidic and/or hydroxidic inorganic or mineral filler.

12. Rubber mixture according to claim 11, wherein the proportion present of the filler in the mixture is from 20 to 200 phr.

13. Rubber mixture according to claim 1, further comprising a coupling reagent.

14. Method of producing a rubber product comprising preparing the vulcanizable rubber mixture according to claim 1 for the production of a vehicle tire, a vehicle tire tread, a hose, a belt, a technical molding or a vibration damper or impact damper.

15. Technical rubber product comprising a vulcanized rubber mixture according to claim 1.

16. Technical rubber product according to claim 15, wherein the product is a tread for a vehicle tire.

17. Vehicle tires with the tread according to claim 16.

* * * * *